(12) United States Patent
Tai

(10) Patent No.: US 10,237,377 B2
(45) Date of Patent: Mar. 19, 2019

(54) PACKET REWRITING APPARATUS, CONTROL APPARATUS, COMMUNICATION SYSTEM, PACKET TRANSMISSION METHOD AND PROGRAM

(71) Applicant: NEC Corporation, Minato-ku, Tokyo (JP)

(72) Inventor: Hideyuki Tai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/771,028

(22) PCT Filed: Mar. 6, 2014

(86) PCT No.: PCT/JP2014/055744
§ 371 (c)(1),
(2) Date: Aug. 27, 2015

(87) PCT Pub. No.: WO2014/136864
PCT Pub. Date: Dec. 9, 2014

(65) Prior Publication Data
US 2016/0014241 A1 Jan. 14, 2016

(30) Foreign Application Priority Data
Mar. 7, 2013 (JP) .................. 2013-045264

(51) Int. Cl.
*H04L 29/06* (2006.01)
*H04L 12/46* (2006.01)
*H04W 28/06* (2009.01)

(52) U.S. Cl.
CPC .......... *H04L 69/22* (2013.01); *H04L 12/4633* (2013.01); *H04L 12/4641* (2013.01); *H04W 28/065* (2013.01)

(58) Field of Classification Search
CPC . H04L 69/22; H04L 12/4633; H04L 12/4641; H04W 28/065
See application file for complete search history.

(56) References Cited

U.S. PATENT DOCUMENTS

2004/0151188 A1* 8/2004 Maveli ................ H04L 12/4641
370/398
2007/0217415 A1* 9/2007 Wijnands ............ H04L 12/1836
370/390

(Continued)

FOREIGN PATENT DOCUMENTS

JP 2012191554 A 10/2012
WO 2011037104 A1 3/2011

OTHER PUBLICATIONS

M. Mahalingam and 7 other authors, "VXLAN: A Framework for Overlaying Virtualized Layer 2 Networks over Layer 3 Network", Aug. 22, 2012 Cited in the Specification.

(Continued)

*Primary Examiner* — Albert T Chou

(57) ABSTRACT

A packet rewriting apparatus is arranged between a tunnel end point and a switch that refers to content of the original header to determine processing to be applied to a packet. The packet rewriting apparatus is provided with: a packet rewriting rule storage unit that stores packet rewriting rule(s) for writing information corresponding to a virtual network identifier included in an additional header of a packet outputted from a tunnel end point, to a prescribed region of the original header; and a packet rewriting unit that rewrites, in accordance with the packet rewriting rule, to a packet in which information corresponding to the virtual network identifier is written to the original header of a transmitted packet.

12 Claims, 15 Drawing Sheets

(56) References Cited

U.S. PATENT DOCUMENTS

2009/0092141 A1* 4/2009 Banerjee .............. H04L 49/354
370/397
2012/0275328 A1* 11/2012 Iwata ................... H04L 69/324
370/252

OTHER PUBLICATIONS

M. Sridharan et al, "NVGRE: Network Virtualization using General Router Encapsulation", Jul. 9, 2012,Cited in the Specification.
Nick McKeown and 7 other authors, "OpenFlow: Enabling Innovation in Campus Networks", Mar. 14, 2008,Cited in the Specification.
"OpenFlow Switch Specification" Version 1.3.1 (Wire Protocol 0x04), Sep. 6, 2012,Cited in the Specification.
OpenFlow Management and Configuration Protocol (OF-Config 1.1), Open Networking Foundation, Jun. 25, 2012, Cited in ISR.
International Search Report for PCT Application No. PCT/JP2014/055744, dated Jun. 3, 2014.

\* cited by examiner

FIG. 4

| VM NAME | CONNECTION DESTINATION VIRTUAL PORT | TENANT ID |
|---|---|---|
| VM1 | Vport1 | 1 |
| VM2 | Vport2 | 2 |

FIG. 5

| TENANT ID | VM NAME | VM MAC ADDRESS | PHYSICAL SERVER IP ADDRESS | PHYSICAL SERVER MAC ADDRESS |
|---|---|---|---|---|
| 1 | VM1 | 00:00:11:11:11:11 | 192.168.50.1 | 00:00:AA:AA:AA:AA |
| 1 | VM2 | 00:00:22:22:22:22 | 192.168.50.2 | 00:00:BB:BB:BB:BB |
| 2 | VM3 | 00:00:33:33:33:33 | 192.168.50.1 | 00:00:AA:AA:AA:AA |
| 2 | VM4 | 00:00:44:44:44:44 | 192.168.50.2 | 00:00:BB:BB:BB:BB |

FIG. 6

| REWRITING RULE NO. | DESTINATION MAC ADDRESS | |
|---|---|---|
| | PRE-REWRITING | POST-REWRITING |
| RULE 1 | 00:00:AA:AA:AA:AA | 02:00:01:xx:xx:xx |
| RULE 2 | 00:00:BB:BB:BB:BB | 02:00:02:xx:xx:xx |

FIG. 9

| PHYSICAL SERVER NO. | PHYSICAL SERVER IP ADDRESS | PHYSICAL SERVER MAC ADDRESS | CONNECTION DESTINATION SWITCH ID | CONNECTION DESTINATION PORT |
|---|---|---|---|---|
| 1 | 192.168.50.1 | 00:00:AA:AA:AA:AA | 0000-0000-0000-0001 | Port-1 |
| 2 | 192.168.50.2 | 00:00:BB:BB:BB:BB | 0000-0000-0000-0005 | Port-3 |

FIG. 15

| ENVIRONMENT | MAXIMUM VALUE OF MAC ADDRESS TO BE PROCESSED BY ONE PHYSICAL SERVER | NIC OPERATION MODE | SWITCH TO BE USED |
|---|---|---|---|
| VIRTUAL SERVER ENVIRONMENT | NUMBER OF OPERATING VMS | PROMISCUOUS MODE | SWITCHING HUB |
| VIRTUAL SERVER ENVIRONMENT & TUNNEL TECHNOLOGY USE | 1 | NORMAL MODE | SWITCHING HUB, REPEATER HUB |
| VIRTUAL SERVER ENVIRONMENT & TUNNEL TECHNOLOGY USE & OPENFLOW USE | NUMBER OF OPERATING TENANTS | PROMISCUOUS MODE | OPENFLOW SWITCH |

PACKET REWRITING APPARATUS, CONTROL APPARATUS, COMMUNICATION SYSTEM, PACKET TRANSMISSION METHOD AND PROGRAM

REFERENCE TO RELATED APPLICATION

The present application is a National Stage Entry of PCT/JP2014/055744 filed Mar. 6, 2014, which is based on and claims the benefit of the priority of Japanese Patent Application No. 2013-045264, filed on Mar. 7, 2013, the disclosures of all of which are incorporated herein in their entirety by reference.

The present invention relates to a packet rewriting apparatus, a control apparatus, a communication system, a packet transmission method and a program, and in particular to a packet rewriting apparatus interposed with respect to tunnel endpoints, a control apparatus, a communication system, a packet transmission method and a program.

BACKGROUND

Technical Field

In recent years, technologies such as VXLAN (Virtual Extensible Local Area Network), NVGRE (Network Virtualization using General Router Encapsulation) and STT (Stateless Transport Tunneling) have been proposed as tunneling protocols that give consideration to application to cloud computing. Non-Patent Literature (NPL) 1 is a draft for VXLAN.

In a VXLAN, at a tunnel end point that is a terminal point of a virtual tunnel, a layer-2 frame is encapsulated, but in so doing, a VXLAN Network Identifier (VNI) having a length of 24 bits is added to an encapsulated header (also known as additional header or outer header) (refer to Non-Patent Literature 1, Page 9, "5. VXLAN Frame Format" and following). The VNI has a length double the VLAN ID defined by IEEE802.1Q, and is attracting attention in that it is possible to dramatically increase the number of "tenants (common users of a physical network)" in the abovementioned cloud computing environment (approximate maximum of 16,770,000 ($2^{24}$). Non-Patent Literature 2 is a draft of NVGRE, in which tunneling similar to VXLAN is performed. In NVGRE also, it is aimed to increase the number of logically divisible segments according to Tenant Network Identifier (TNI) having a length of 24 bits.

Meanwhile, technology known as OpenFlow has been proposed (see Non-Patent Literatures 3 and 4). In OpenFlow communication is taken as end-to-end flow, and path control, failure recovery, load balancing, and optimization are performed on a per-flow basis. An OpenFlow switch as specified in Non-Patent Literature 4 is provided with a secure channel for communication with an OpenFlow controller, and operates according to a flow table in which addition or rewriting is instructed by the OpenFlow controller as appropriate. In the flow table, for each flow there are definitions of sets of match conditions (Match Fields) to match against packet headers, flow statistical information (Counters), and instructions (Instructions) that define processing content (refer to "5.2 Flow Table" in Non Patent Literature 4).

For example, when an OpenFlow switch receives a packet, a search is made for an entry having a matching condition (see "5.3 Matching" in Non-Patent Literature 4) that matches header information of the received packet, from the flow table. As a result of the search, in a case where an entry matching the received packet is found, the OpenFlow switch updates the flow statistical information (Counters) and also implements processing content (packet transmission from a specified port, flooding, dropping, and the like) described in an Instructions field of the entry in question, for the received packet. On the other hand, as a result of the search, in a case where an entry matching the received packet is not found, the OpenFlow switch transmits a request for entry setting, to the OpenFlow controller via the secure channel, that is, a request (Packet-In message) to transmit control information for processing the received packet. The OpenFlow switch receives a flow entry determined by processing content and updates the flow table. In this way, the OpenFlow switch performs packet forwarding using entries stored in the flow table as control information.

[NPL 1]
M. Mahalingam and 7 other authors, "VXLAN: A Framework for Overlaying Virtualized Layer 2 Networks over Layer 3 Network", [online], [search performed on Feb. 18, 2013)], Internet <URL: http://tools.ietf.org/pdf/draft-mahalingam-dutt-dcops-vxlan-02.pdf>

[NPL 2]
M. Sridharan and 8 other authors, "NVGRE: Network Virtualization using General Router Encapsulation", [online], [search performed on Feb. 18, 2013], Internet <URL: http://tools.ietf.org/pdf/draft-sridharan-virtualization-nvgre-01.pdf>

[NPL 3]
Nick McKeown and 7 other authors, "OpenFlow: Enabling Innovation in Campus Networks", [online], [Search performed on Feb. 18, 2013], Internet <URL: http://www.o-penflow.org/documents/openflow-wp-latest.pdf>

[NPL 4]
"OpenFlow Switch Specification" Version 1.3.1 (Wire Protocol 0x04), [online], [Search performed on Feb. 18, 2013], Internet <URL: https://www.opennetworking.org/images/stories/downloads/specification/openflow-spec-v1.3.1.pdf>

SUMMARY

The following analysis is given according to the present invention. When building a virtual network using tunneling technology such as VXLAN or NVGRE as described above, consideration may be given to using an OpenFlow switch of Non-Patent Literature 3 and 4, as an apparatus for connecting between virtual tunnel end points.

However, there has been little commercialization of OpenFlow switches that enable designation, as a match condition, of an encapsulated header (additional header) added between tunnel end points of the abovementioned VXLAN and NVGRE. As a result, in a general OpenFlow switch, there is a problem in that it is not possible to apply different processing based on identifiers such as VNI or TNI included in the encapsulated header (additional header). Of course there also exist switches where it is possible to designate these identifiers as a match condition, but they are expensive.

It is an object of the present invention to provide a packet rewriting apparatus, a control apparatus, a communication system, a packet transmission method and a program, that can contribute to facilitating packet control between tunnel end points in a tunneling protocol such as the abovementioned VXLAN or NVGRE.

According to a first aspect, there is provided a packet rewriting apparatus that includes: a packet rewriting rule storage unit that stores a packet rewriting rule for writing information corresponding to a virtual network identifier included in an additional header of a packet outputted from a tunnel end point, to a prescribed region of an original header; and a packet rewriting unit that rewrites, in accordance with the packet rewriting rule, to a packet in which information corresponding to the virtual network identifier is written to the original header of a transmitted packet.

According to a second aspect there is provided a control apparatus that includes: a packet rewriting rule creation unit that creates a packet rewriting rule to write information corresponding to a virtual network identifier included in an additional header of a packet outputted from a tunnel end point, to a prescribed region of an original header; and a control unit that distributes the created packet rewriting rule to a packet rewriting apparatus arranged between a switch and the tunnel end point.

According to a third aspect there is provided a communication system that includes: a switch that refers to content of an original header to determine processing to be applied to a packet; a control apparatus that controls the switch by setting control information that determines a match condition that matches content of the original header, and processing to be applied to a packet matching the match condition, in the switch; a packet rewriting rule storage unit that stores a packet rewriting rule for writing information corresponding to a virtual network identifier included in an additional header of a packet outputted from a tunnel end point, to a prescribed region of the original header; and a packet rewriting apparatus comprising a packet rewriting unit that rewrites, in accordance with the packet rewriting rule, to a packet in which information corresponding to the virtual network identifier is written to the original header of a transmitted packet, the packet rewriting apparatus being arranged between the tunnel end point and a switch that refers to content of the original header to determinate processing to be applied to a packet; wherein path control of a packet interposed with respect to the tunnel end point is performed via the switch and the tunnel end point.

According to a fourth aspect there is provided a packet transmission method that includes: rewriting information corresponding to a virtual network identifier included in an additional header of a packet outputted from a tunnel end point, in accordance with a packet rewriting rule for writing to a prescribed region of an original header, to a packet in which information corresponding to the virtual network identifier is written to the original header of a transmitted packet; and transmitting the rewritten packet to a switch via a prescribed physical port. This method is associated with a particular mechanism known as a packet rewriting apparatus that is arranged between a tunnel end point and the switch.

According to a fifth aspect there is provided a program that executes, on a computer to which a packet outputted from a tunnel end point is inputted, a process of rewriting information corresponding to a virtual network identifier included in an additional header of a packet outputted from a tunnel end point, in accordance with a packet rewriting rule for writing to a prescribed region of an original header, to a packet in which information corresponding to the virtual network identifier is written to the original header of a transmitted packet; and a process of transmitting the rewritten packet to a switch via a prescribed physical port. It is to be noted that this program may be recorded on a computer-readable (non-transient) storage medium. That is, the present invention may be embodied as a computer program product.

According to the invention it is possible to contribute to facilitation of packet control between tunnel end points in a tunneling protocol.

BRIEF DESCRIPTION OF THE DRAWINGS

FIG. 4 is an example of tenant information held by a virtual switch of the first exemplary embodiment.

FIG. 5 is an example of VM management information for describing operations of the first exemplary embodiment.

FIG. 6 is an example of a packet rewriting rule held in a packet rewriting rule storage unit of the first exemplary embodiment.

FIG. 9 is an example of physical server information for describing operations of the first exemplary embodiment.

FIG. 15 is a functional block diagram showing a configuration of a controller of a second exemplary embodiment.

PREFERRED MODES

Figure 1:
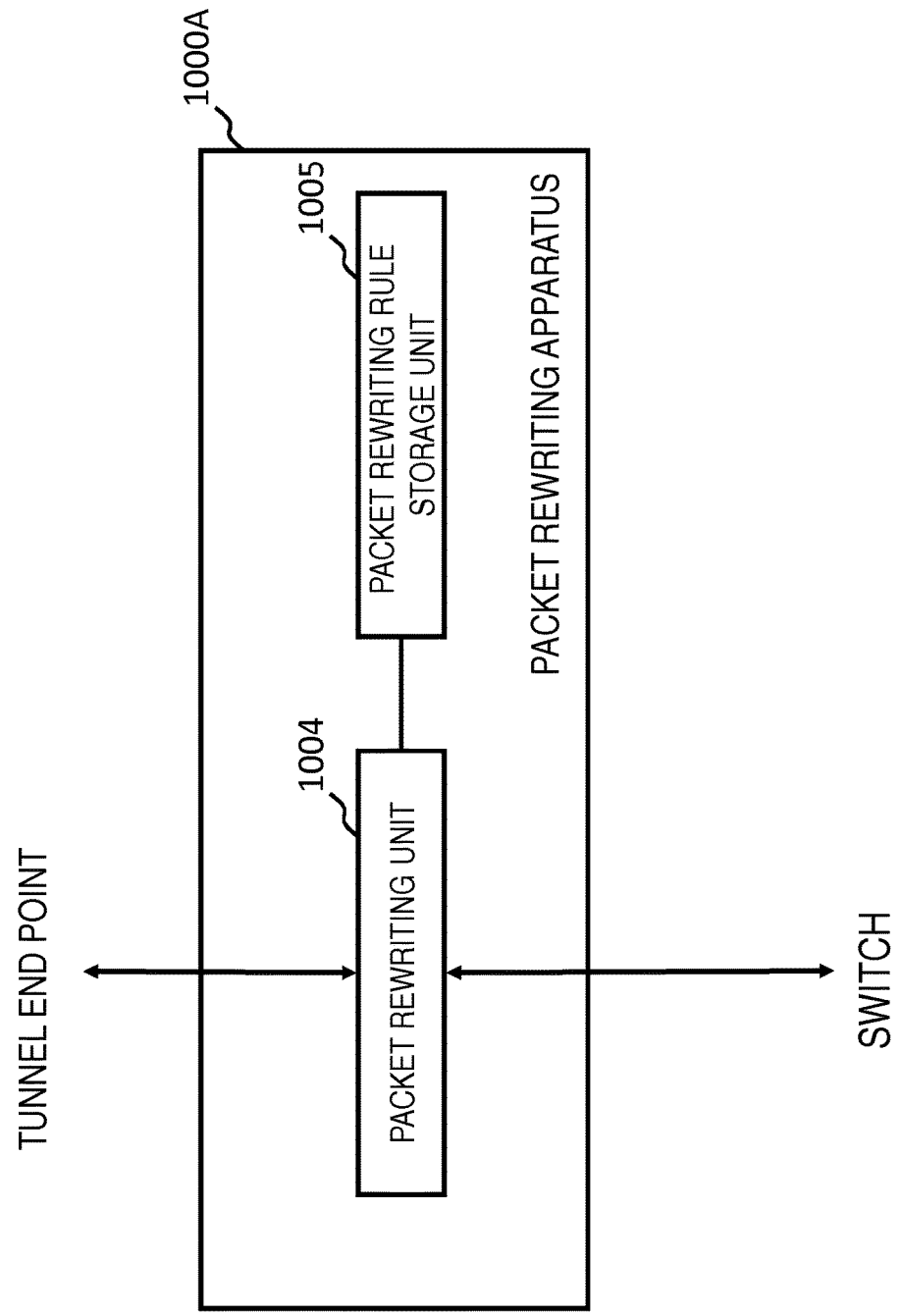
FIG. 1 is a diagram showing a configuration of a packet rewriting apparatus of an exemplary embodiment.

First, a description is given of an outline of exemplary embodiments of the present disclosure, making reference to the drawings. It is to be noted that reference symbols in the drawings attached to this outline are added to respective elements for convenience, as examples in order to aid understanding, and are not intended to limit the present disclosure to modes illustrated in the drawings.

An exemplary embodiment of the present disclosure, as shown in FIG. 1, may be implemented as a packet rewriting apparatus 1000A arranged between a tunnel end point and a switch. The packet rewriting apparatus 1000A is provided with: a packet rewriting rule storage unit 1005 that stores packet rewriting rule(s) for writing, to a prescribed region of an original header, information corresponding to a virtual network identifier included in an additional header of a packet outputted from the tunnel end point; and a packet rewriting unit 1004. The packet rewriting unit 1004 then executes processing to rewrite, in accordance with the packet rewriting rule, an output packet from the tunnel end point, to a packet in which information corresponding to the virtual network identifier is written to the original header.

As described above, by arranging the abovementioned packet rewriting apparatus 1000A between a tunnel end point and switch, the virtual network identifier (tenant ID) itself, such as VNI or TNI included in an encapsulated header (additional header) or information corresponding thereto, is written to the original header. A switch interposed with respect to the packet rewriting apparatus 1000A can perform forwarding processing and the like, based on the virtual network identifier (tenant ID) included in a rewritten header (see FIG. 9 and FIG. 11). It is to be noted that it is desirable to arrange a packet rewriting apparatus 1000A that distributes the same packet rewriting rule at a tunnel end point on a receiving side also, as necessary, and to perform processing to restore a received packet to a pre-rewriting state. In this way it is possible to realize bi-directional flow control.

First Exemplary Embodiment

Figure 2:
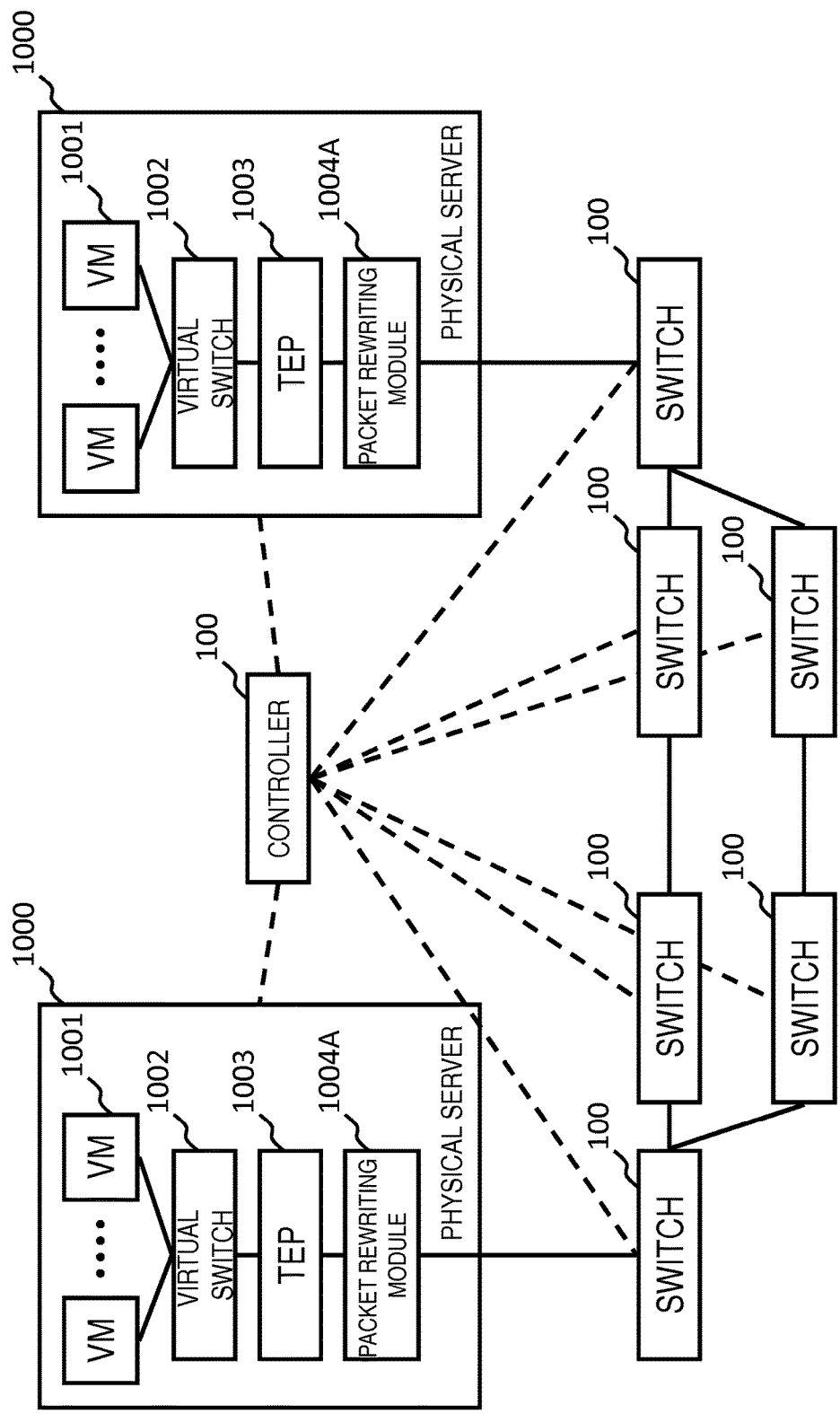
FIG. 2 is a diagram showing a configuration of a communication system of a first exemplary embodiment.

Next, a detailed description is given concerning a first exemplary embodiment in which a packet rewriting apparatus is built into a physical server of a data center or the like, with reference being made to the drawings. FIG. 2 is a diagram showing a configuration of a communication system according to the first exemplary embodiment. Referring to FIG. 2, a configuration is shown which connects 2 physical servers 1000 arranged at respective base points, switches 10 connected between the base points, and a controller 100 that controls these switches 10. It is to be noted that the configuration shown in FIG. 2 may be employed, for example, as a configuration connecting between data centers.

The controller 100 is connected to the switches 10 and the physical servers 1000 via control channels represented by dashed lines in the drawing.

The switches 10 are configured by OpenFlow switches that perform packet rewriting, forwarding and the like, in accordance with control information (flow entries) set by the controller 100.

Figure 3:
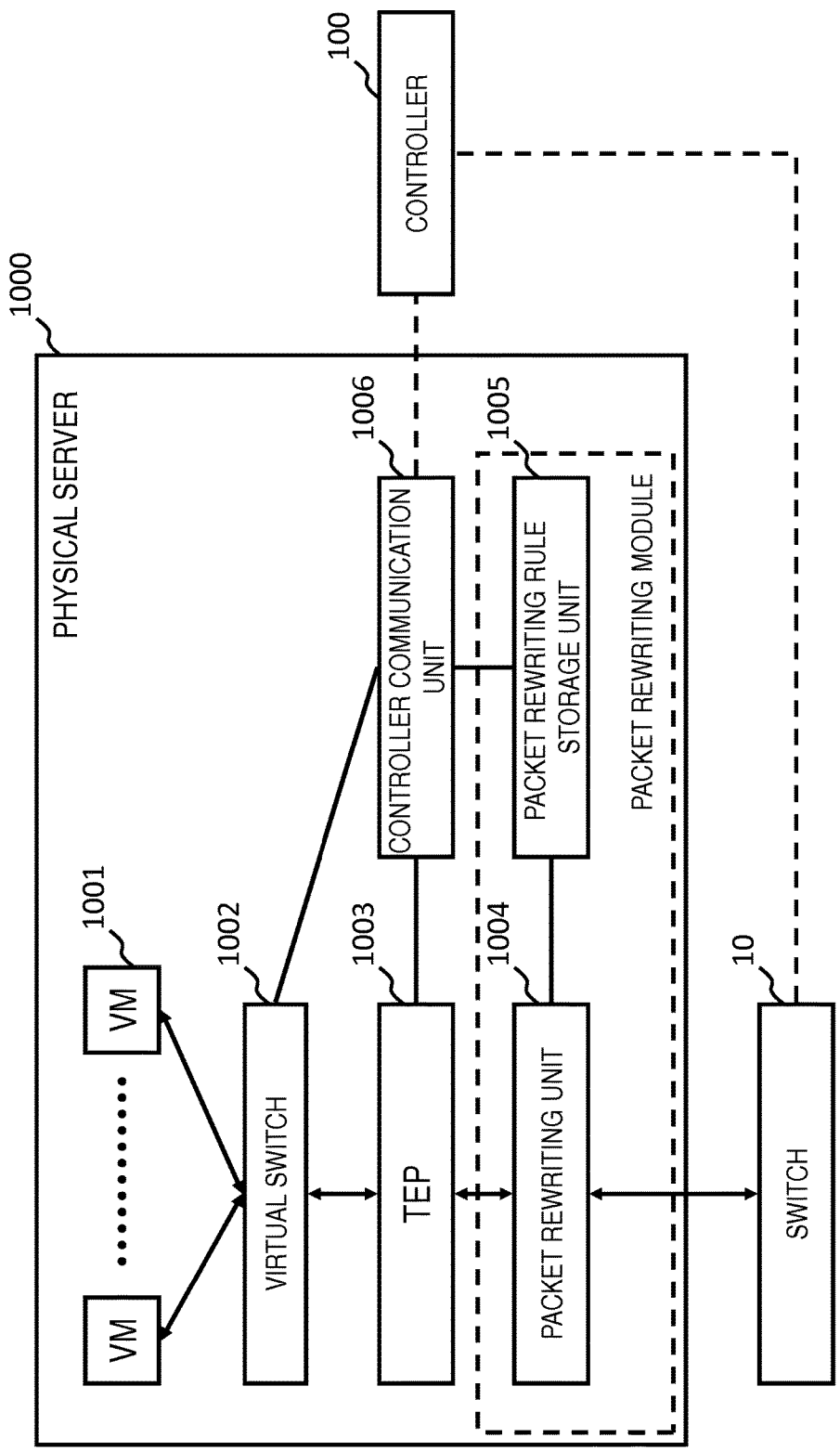
FIG. 3 is a functional block diagram showing a configuration of a physical server of the first exemplary embodiment.

The physical servers 1000, as shown in the detailed diagram of FIG. 3, are provided with VMs (Virtual Machines) 1001, a virtual switch 1002, a tunnel end point 1003, a packet rewriting unit 1004, a packet rewriting rule storage unit 1005, and a controller communication unit 1006. It is to be noted that the packet rewriting unit 1004 and the packet rewriting rule storage unit 1005 of FIG. 3 correspond to the packet rewriting module 1004A of FIG. 2. The controller communication unit 1006 is omitted in FIG. 2.

The VM 1001 is a virtual machine managed by a hypervisor or the like, omitted in the diagram, and operates on a virtualized platform in a physical server. The VM 1001 belongs to some virtual network (referred to also as "tenant" below), and it is possible to perform communication with a VM 1001 belonging to the same virtual network operating on another physical server, via the virtual switch 1002, the tunnel end point 1003, and the packet rewriting unit 1004.

The virtual switch 1002 holds a MAC (Media Access Protocol) address table for each tenant, and forwards packets received from the VM 1001 or the tunnel end point 1003 to an appropriate destination. More specifically, on receiving a packet, the virtual switch 1002 refers to the MAC address table for each tenant to which the packet in question belongs, and forwards the packet to the relevant port of the same tenant.

Thus, the virtual switch 1002 holds information as to which tenant each VM 1001, connected thereto, belongs. FIG. 4 is an example of tenant information held by the virtual switch 1002. The virtual switch 1002 refers to the tenant information shown in FIG. 4 to identify the ID of a tenant to which a VM, which is the transmission source of a received packet, belongs. It is to be noted that synchronization management is performed with respect to the tenant information shown in FIG. 4 and tenant information held by the controller, via the controller communication unit 1006, for example.

The virtual switch 1002, in a case where a VM that is the destination of a received packet is connected to the same virtual switch (the apparatus itself), forwards the packet to the VM. On the other hand, in a case where the destination of the received packet is a VM operating on another physical server, the virtual switch 1002 forwards the packet to the tunnel end point 1003, so that the packet is delivered to the physical server. On this occasion, the virtual switch 1002 gives notification of the tenant ID to which the VM belongs, to the tunnel end point 1003.

It is to be noted that instead of the virtual switch as described above, it is possible to use a virtual switch that virtualizes an OpenFlow switch equivalent to a switch 10 operating in accordance with control information (flow entry) set by the controller.

The tunnel end point (TEP) 1003 encapsulates packets in accordance with a tunneling protocol such as VXLAN or NVGRE. The tunnel end point 1003 holds VM management information.

FIG. 5 is an example of VM management information held by the tunnel end point 1003. In the example of FIG. 5, information is stored regarding which tenant a VM belongs to, and on which physical server it exists.

On receiving a packet from the virtual switch 1002, the tunnel end point 1003 searches for the entry in question from the VM management information of FIG. 5, with the tenant ID to which the VM of the packet source belongs and the destination MAC address as keys. Based on the entry, the packet is then encapsulated, and the encapsulated packet is forwarded to the packet rewriting unit 1004. The tunnel end point stores the IP (Internet Protocol) address of a physical server retrieved from the VM management information and the MAC address of the physical server in a header on an outer side of the encapsulated packet (additional header, outer header).

Conversely, on receiving a packet from the packet rewriting unit 1004, the tunnel end point 1003, after returning (decapsulating) an encapsulated packet to a original packet, forwards it to the virtual switch 1002. At this occasion, the tunnel end point 1003 provides notification of tenant ID embedded in the header for encapsulation (additional header, outer header), to the virtual switch 1002.

The packet rewriting rule storage unit 1005 stores rules indicating how an encapsulated packet is to be rewritten. FIG. 6 is an example of packet rewriting rules held in the packet rewriting rule storage unit 1005. FIG. 6 shows an example of packet rewriting rules in which an identifier (upper 3 octets used; specific value designated by the controller) of a destination physical server, and tenant ID (lower 3 octets used; tenant ID embedded in xx:xx:xx portion) are written to a destination MAC address field of a header (original header) before a header (additional header, outer header) for encapsulation is added. It is to be noted that the packet rewriting rules are set in the packet rewriting rule storage unit 1005 by the controller 100, and are synchronized with packet rewriting rules held in the packet rewriting rule storage unit 104 of the controller 100.

Figure 7:
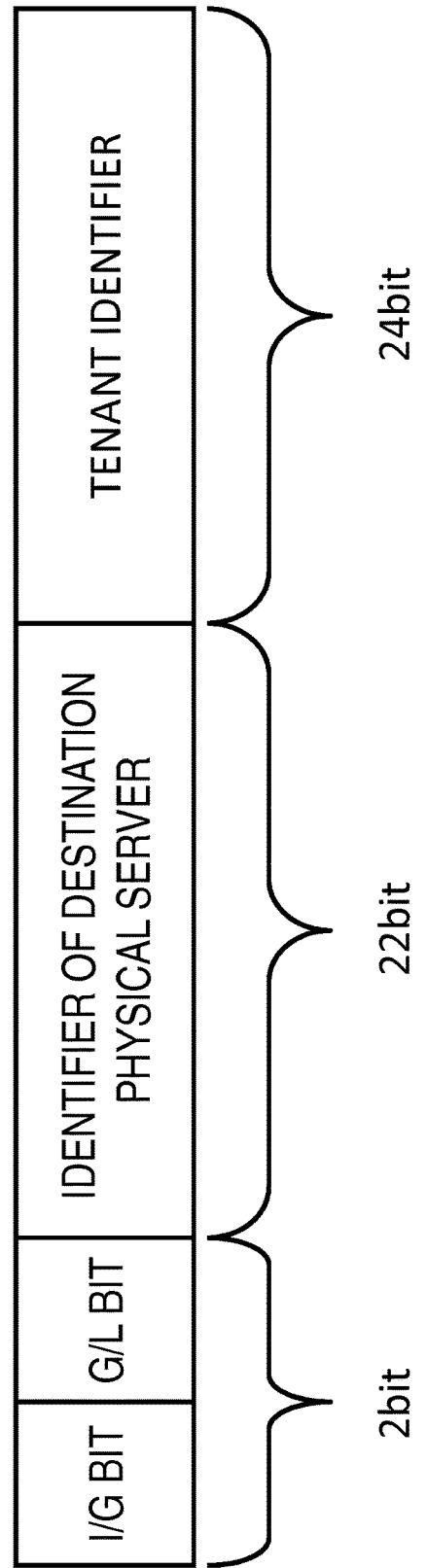
FIG. 7 is a diagram showing content of a destination MAC address field after rewriting according to a packet rewriting rule of the first exemplary embodiment.

FIG. 7 is a diagram showing content of a destination MAC address field after rewriting according to a packet rewriting rule of FIG. 6. As shown in FIG. 7, according to the packet rewriting rule of FIG. 6, processing is performed to rewrite an OUI (Organizationally Unique Identifier) portion, being the upper 24 bits of an original MAC address, to the identifier of a destination physical server, and an NIC (Network Interface Controller) identification portion, being the lower 24 bits, to a tenant identifier. It is to be noted that the I/G bit of FIG. 7 indicates an individual address/group address identifier bit, and G/L indicates a global address/local address identifier bit.

On receiving a packet from the tunnel end point 1003, the packet rewriting unit 1004 rewrites the destination MAC address of the packet, in accordance with a packet rewriting rule of the packet rewriting rule storage unit 1005. Specifically, the packet rewriting unit 1004 rewrites the upper 24 bits of the destination MAC address of the original header to the identifier of a physical server specified in the packet rewriting rule. The packet rewriting unit 1004 executes processing to extract a tenant ID from a header (additional header, outer header) for encapsulation of a received packet, and embeds it in the lower 24 bits of the MAC address of the original header.

When the packet rewriting processing is finished, the packet rewriting unit 1004 forwards the rewritten packet to a physical port.

Conversely, on receiving a packet from a switch 10 side, the packet rewriting unit 1004 performs an operation to restore the packet to the original packet, in accordance with content of the packet rewriting rule storage unit 1005. Specifically, the packet rewriting unit 1004 performs an operation to restore the upper 24 bits and the lower 24 bits of the destination MAC address of the original header, to content prior to rewriting as indicated in FIG. 6.

The controller communication unit 1006 performs an operation to forward information distributed by the controller 100 (tenant information, VM management information, packet rewriting rules, etc.) to the virtual switch 1002, the tunnel end point 1003 and the packet rewriting rule storage unit 1005, respectively.

Next, a description is given concerning the controller 100 that, in addition to control of the switch 10, performs setting to respective parts inside the abovementioned physical server 1000. The controller 100 sets packet rewriting rules with respect to the physical server 1000, and also sets control information (flow entries) for forwarding of packets on which rewriting has been implemented, to switches 10 on a packet forwarding path.

Figure 8:
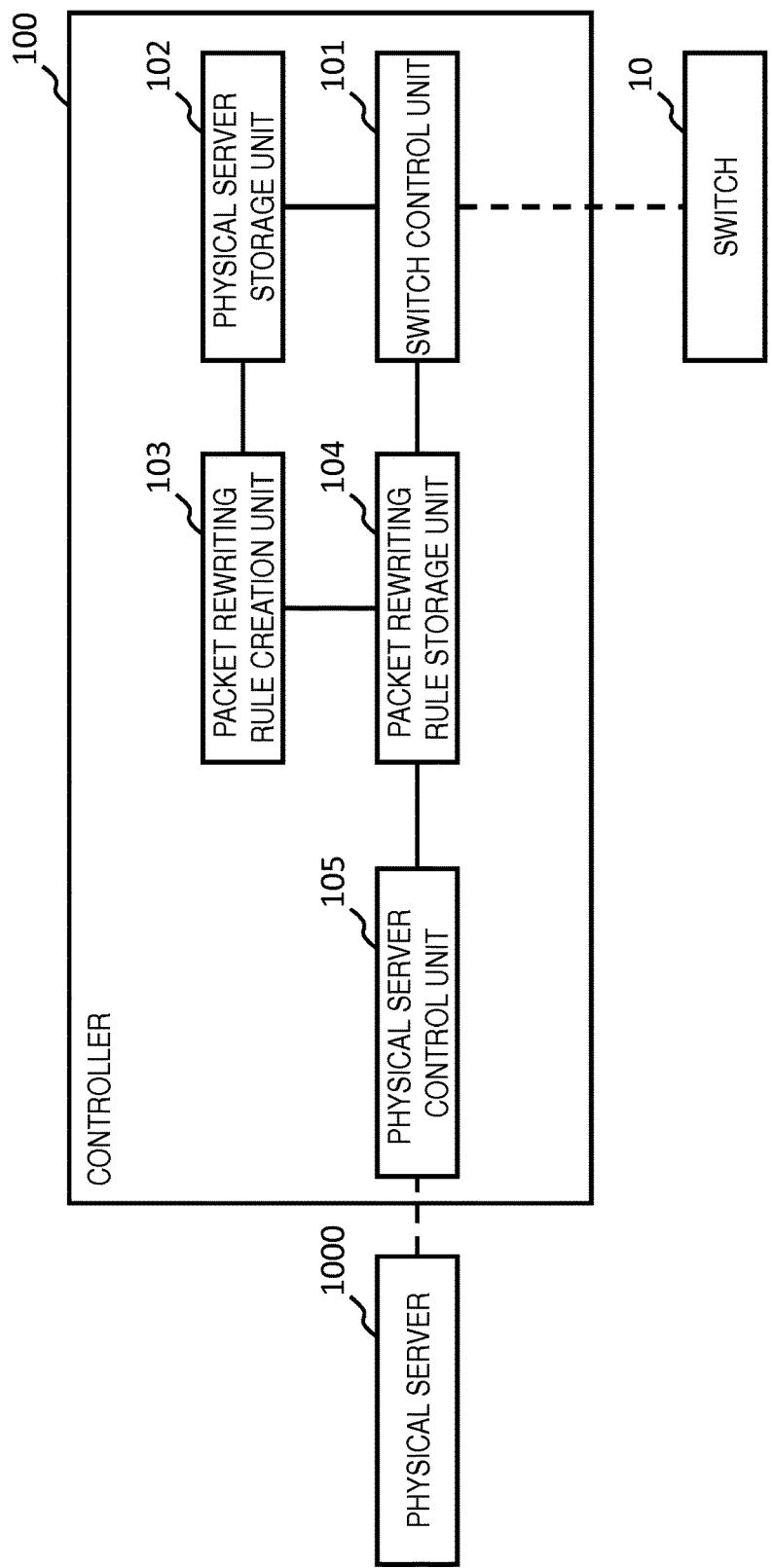
FIG. 8 is a functional block diagram showing a configuration of a controller of the first exemplary embodiment.

FIG. 8 is a functional block diagram showing a configuration of the controller 100 of the present exemplary embodiment. Referring to FIG. 8, a configuration is shown that is provided with a switch control unit 101, a physical server storage unit 102, a packet rewriting rule creation unit 103, a packet rewriting rule storage unit 104, and a physical server control unit 105.

The switch control unit 101 comprehends network topology, based on information received from switch(es) 10, and calculates path(s) between respective physical servers in the network identified using physical server information stored in the physical server storage unit 102. The switch control unit 101 uses the physical server information and packet rewriting rule(s) of the packet rewriting rule storage unit 104, to create control information (flow entries) designating packet forwarding and the like, along a path with regard to switch(es) 10 on the path. In addition, the switch control unit 101 sets the created control information (flow entries) in respective switches. In the present exemplary embodiment, the switch control unit 101 creates path(s) between all physical servers having tunnel end points, and sets the control information (flow entries) so that all tunnel end points are in a state where communication is possible.

The physical server storage unit 102 stores physical server information including addresses of respective physical servers and switch information of connection destinations. FIG. 9 is an example of physical server information. The IP address and MAC address of the physical server are used when a destination address is designated in match conditions of control information (flow entries). A connection destination switch ID or a connection destination port number thereof are referred to when performing path calculations, when identifying switches as start point and end point of a path to be calculated.

When the physical server 1000 is added to the network, the packet rewriting rule creation unit 103 creates a packet rewriting rule corresponding to the physical server. In the present exemplary embodiment, the packet rewriting rule creation unit 103 assigns an identifier (ID) that is unique in a system for respective physical servers, and creates packet rewriting rules shown in FIG. 6, based on the identifier thereof and on added physical server MAC address. The created packet rewriting rules are stored in the packet rewriting rule storage unit 104, and at appropriate timing, the physical server control unit 105 transmits to the physical server 1000.

It is to be noted that the following may be considered with regard to timing of distributing the packet rewriting rules. For example, a method may be used whereby packet rewriting rules are distributed to all physical servers whenever a packet rewriting rule is created, or are distributed only to physical servers for which the packet rewriting rule is required. For example, focusing on 2 particular physical servers, in a case where virtual machines belonging to the same tenant on these 2 physical servers have not been operated, there is no necessity for these 2 physical servers to communicate. Accordingly, there is no necessity to distribute, to these 2 physical servers, packet rewriting rules for implementing communication with the other physical server.

With regard to timing of distribution of packet rewriting rules, there is a method whereby the controller 100 does not perform distribution in advance, and a query is made to the controller 100 when respective physical servers require a rewriting rule. For example, it is possible to use a method whereby the packet rewriting unit 1004 of the physical server 1000 receives a packet, and as a result of searching for a packet rewriting rule held by the packet rewriting rule storage unit 1005, in a case where the relevant packet rewriting rule is not present, the packet rewriting unit 1004 makes a request for a packet rewriting rule to the controller 100.

As described above, the packet rewriting unit 1004 of each physical server 1000 embeds a physical server identifier and tenant ID in the destination MAC address field of the packet. By the controller 100 setting, in each switch 10, a flow entry in which the physical server identifier and tenant ID are included in a match condition, it is possible to implement packet forwarding.

The physical server control unit 105 transmits a packet rewriting rule to the physical server(s) 1000, and updates storage content of the packet rewriting rule storage unit 1005. The physical server control unit 105 distributes the tenant information described above (see FIG. 4) and VM management information (see FIG. 5) to each physical server 1000.

It is to be noted that respective parts (processing means) of the physical servers and controllers (including configurations divided into OpenFlow controller and server controller) shown in FIG. 2, FIG. 3, FIG. 8 and FIG. 14 may be implemented by a computer program that executes the abovementioned respective processing on a computer configuring these apparatuses, using hardware thereof.

Figure 10:
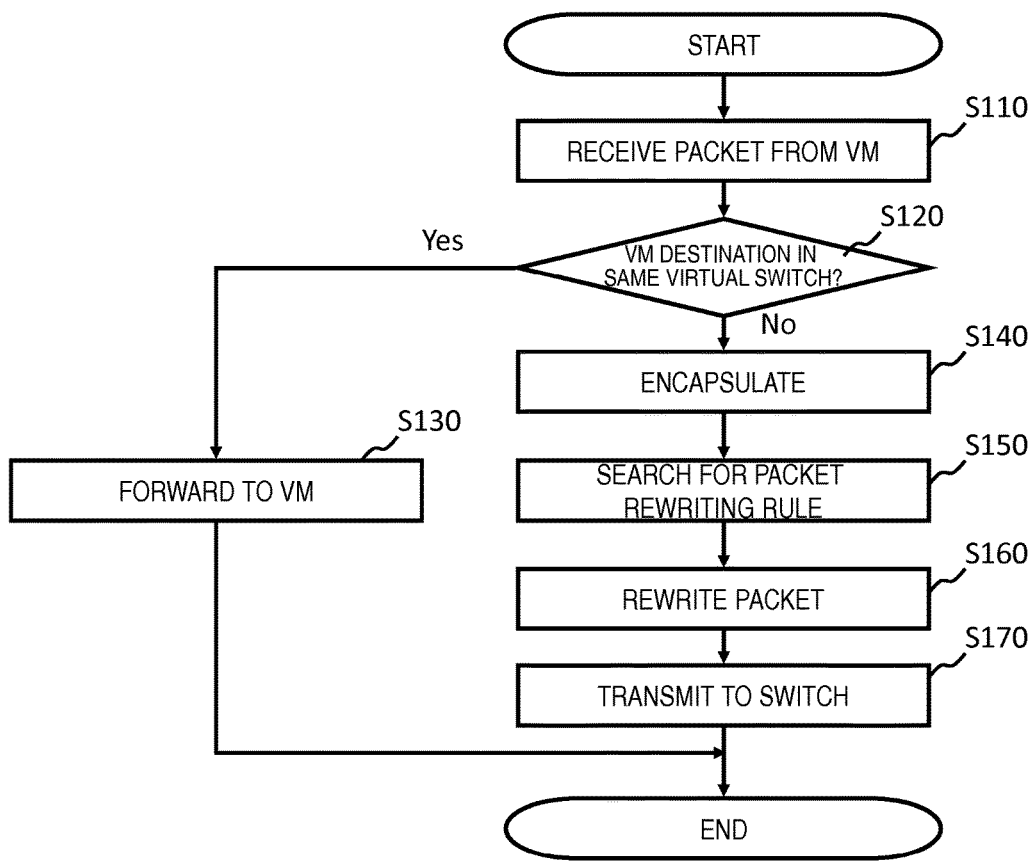
FIG. 10 is a flowchart representing operations (when packets are transmitted) of a physical server of the first exemplary embodiment.

Next, a detailed description is given concerning operations of the present exemplary embodiment, making reference to the drawings. FIG. 10 is a flowchart representing operations of a physical server of the first exemplary embodiment when packets are transmitted. Referring to FIG. 10, first the virtual switch 1002 receives a packet transmitted from a VM (step S110).

Next, in a case of a packet where the forwarding destination of the received packet is to a VM connected to the same virtual switch (Yes in step S120), the virtual switch 1002 forwards the packet to the VM connected to the same virtual switch (step S130).

On the other hand, in a case of a packet where the forwarding destination of the received packet is not to a VM connected to the same virtual switch (No in step S120), the virtual switch 1002 sends the received packet along with tenant ID to the tunnel end point 1003. The tunnel end point 1003 implements encapsulation adding an encapsulated header (additional header) including the tenant ID to the packet (step S140).

Next, the packet rewriting unit 1004 retrieves a packet rewriting rule to be applied to the relevant packet, with the destination MAC address of the encapsulated packet, that is, the MAC address of the destination physical server, as a key, from the packet rewriting rule storage unit 1005 (step S150).

For example, in a case where the MAC address of the destination physical server is 00:00:BB:BB:BB:BB, the packet rewriting unit 1004 uses a rule where the MAC address is 00:00:BB:BB:BB:BB, among the packet rewriting rules of FIG. 6, to rewrite the destination MAC address of the original header of the relevant packet to "02:00:02:xx:xx:xx" (step S160). Note that a tenant identifier included in the encapsulated header (additional header) is set in "xx:xx:xx".

The packet rewriting unit 1004 then transmits the rewritten packet to a switch 10 via a physical port (step S170).

Figure 11:
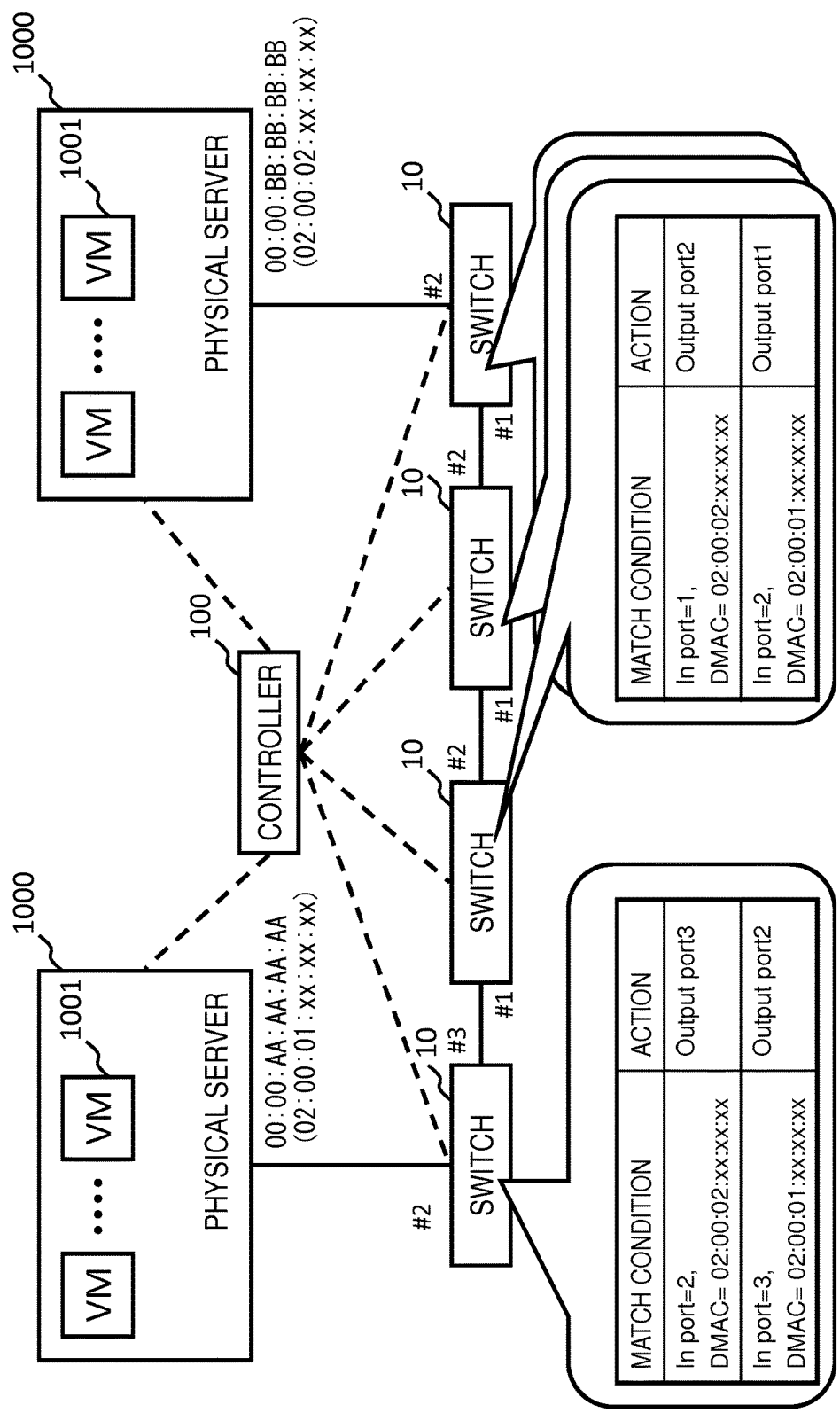
FIG. 11 is an example of control information (flow entries) set by a controller of the first exemplary embodiment.

Meanwhile, the controller 100 sets, in switch(es) 10 on a path between the physical servers 1000, the packet rewriting rule described above and the physical server identifier in control information (flow entry) as a match condition. Therefore, a packet transmitted from the packet rewriting unit 1004 is forwarded to an opposing physical server 1000 by a switch on the path as shown in FIG. 11 (the numerals #n attached to the vicinity of the switches in FIG. 11 indicate port numbers).

Figure 12:
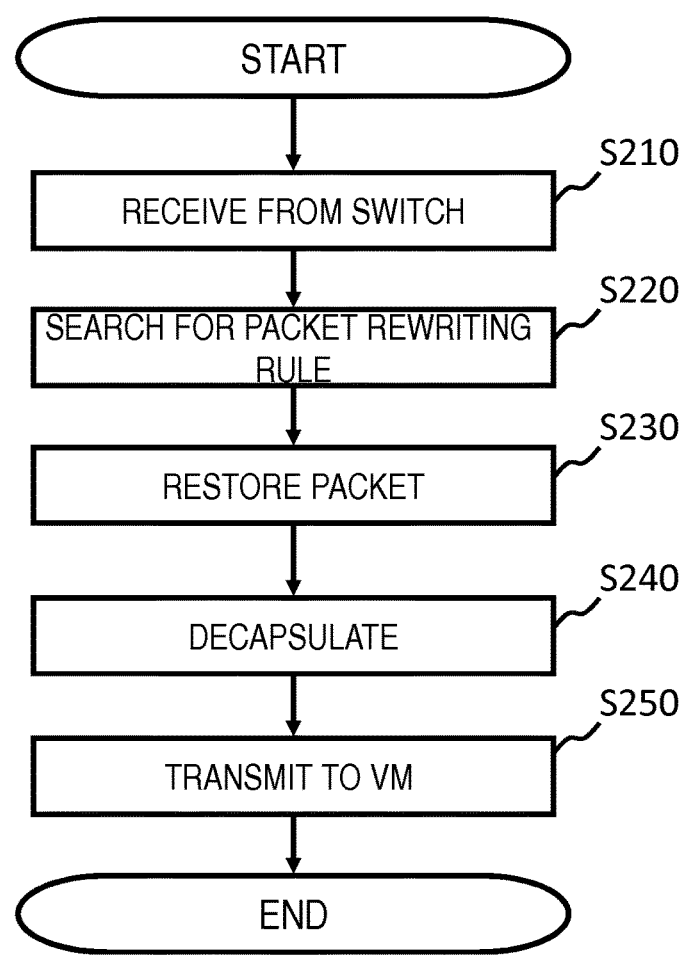
FIG. 12 is a flowchart representing operations (when packets are received) of a physical server of the first exemplary embodiment.

FIG. 12 is a flowchart representing operations of a physical server of the first exemplary embodiment when packets are received. Referring to FIG. 12, when a packet in which the packet rewriting is implemented is received from a switch 10 (step S210), the packet rewriting unit 1004 retrieves a packet rewriting rule to be applied to the relevant rewritten packet, with content of the rewritten MAC address field as a key, from the packet rewriting rule storage unit 1005 (step S220).

For example, in a case where the MAC address field of the destination physical server is rewritten to 02:00:02:xx:xx:xx, the packet rewriting unit 1004 uses a rule where the MAC address after rewriting is 00:00:BB:BB:BB:BB, among the packet rewriting rules of FIG. 6, to restore the destination MAC address of the original header of the relevant packet to "00:00:BB:BB:BB:BB" (step S230).

The tunnel end point 1003 implements decapsulation with respect to the packet and sends it to the virtual switch 1002 (step S240).

The virtual switch 1002 selects a MAC address table based on the tenant ID sent from the tunnel end point 1003, and forwards the packet to the relevant VM, based on an entry that matches the header of the decapsulated packet, that is, the original header (step S250).

As described above, it is possible to forward the packet transmitted from the VM of one of the physical servers to an opposing physical server, with encapsulated header attached. As shown in FIG. 11, by having control information (flow entry) for forwarding packets on a return path (opposite direction) set, it is possible to forward a response from the VM that receives the packet, in a procedure the same as described above.

Figure 13:
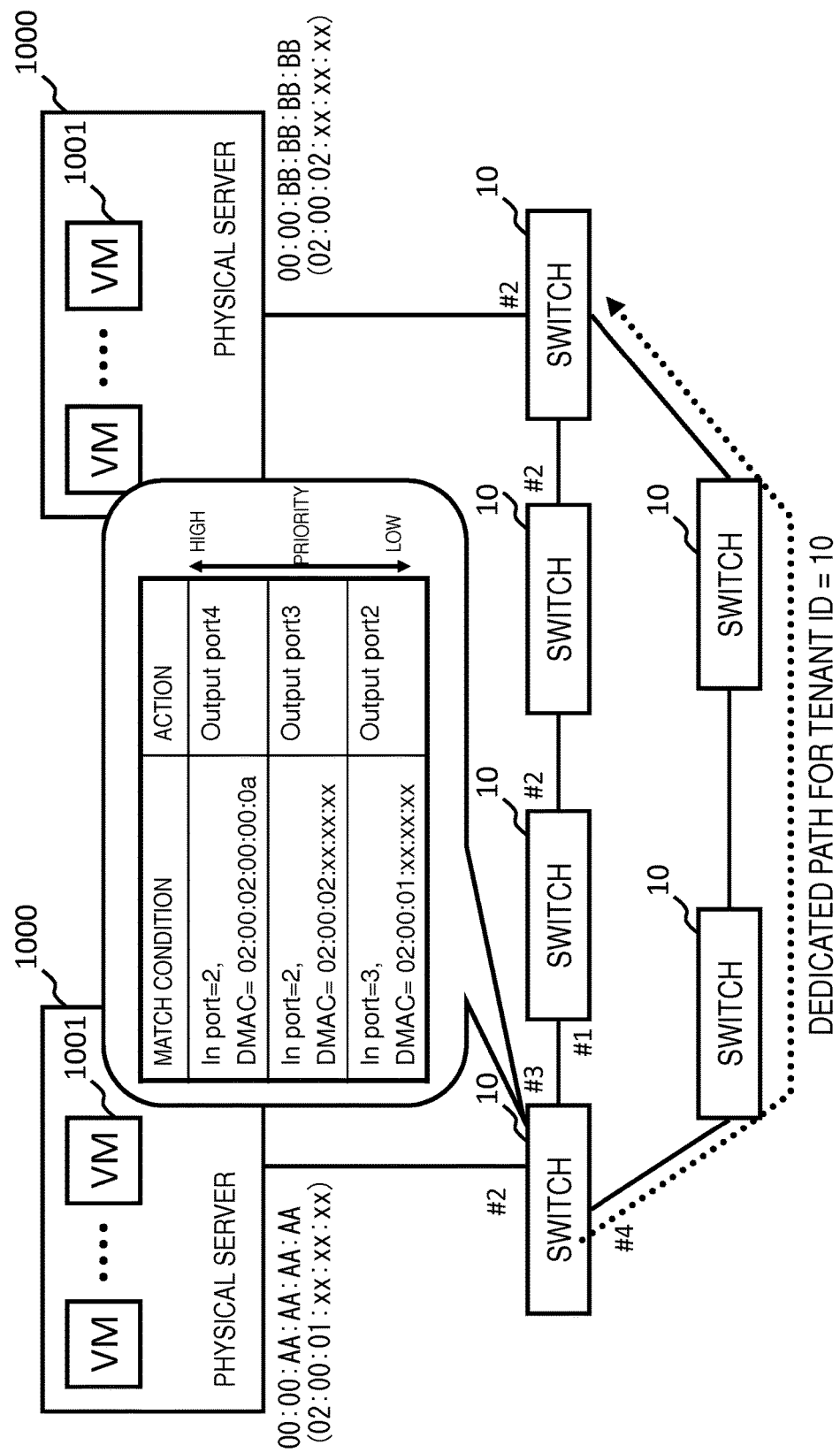
FIG. 13 is another example of control information (flow entries) set by a controller of the first exemplary embodiment.

According to the present exemplary embodiment, it is also possible to perform particular control for only packets of a specific tenant. FIG. 13 is an example in which control information (flow entries) is set so that only packet(s) from a VM with tenant ID=10 (00:00:0a) are forwarded on a path arranged at the lower part of FIG. 13. For example, when the switch at the left edge of FIG. 13 receives a packet (MAC address already rewritten as "02:00:02:00:00:0a") from a VM with tenant ID=10, the switch 10 applies the entry with highest priority (entry at the topmost level in the balloon in FIG. 13) from among matching control information (flow entries) and forwards the packet from port #4. On the other hand, since packet(s) from other tenants do not match the topmost entry in the balloon in FIG. 13, they are forwarded by the path at the upper side of FIG. 13 (the same path as in FIG. 11).

As described above, according to the present exemplary embodiment, even without using an expensive switch that can interpret an encapsulated header, it is possible to implement flow control between base points using tunnel technology.

According to the present exemplary embodiment, it is also possible to implement label switching equivalent to MPLS (Multi-Protocol Label Switching) using an Open-Flow switch. In the first exemplary embodiment, the packet rewriting unit 1004 of the physical server 1000 embeds an identifier of the tunnel end point 1003 in the destination MAC address field of a packet. It is possible to treat this identifier as a label in MPLS and forward the packet to a switch 10. In an MPLS network, it is necessary to perform processing in which an MPLS router autonomously calculates a label and distributes it to an adjacent router. On the other hand in the present exemplary embodiment, the controller instructs rewriting to embed an identifier of a tunnel end point in a packet, in addition to creating control information (flow entry) with the identifier as a match condition, to be set in respective switches 10 in the network. The present exemplary embodiment is advantageous in that the switches 10 need not create a label or perform path calculation, and processing is reduced in comparison to an MPLS router.

A description has been given above of an exemplary embodiment of the present invention, but the present invention is not limited to the abovementioned exemplary embodiment, and modifications, substitutions and adjustments may be added within a scope that does not depart from fundamental technical concepts of the invention. For example, network configuration and element configuration shown in the respective drawings are examples in order to aid understanding of the invention, and are not intended to limit the invention to configurations illustrated in the drawings.

Figure 14:
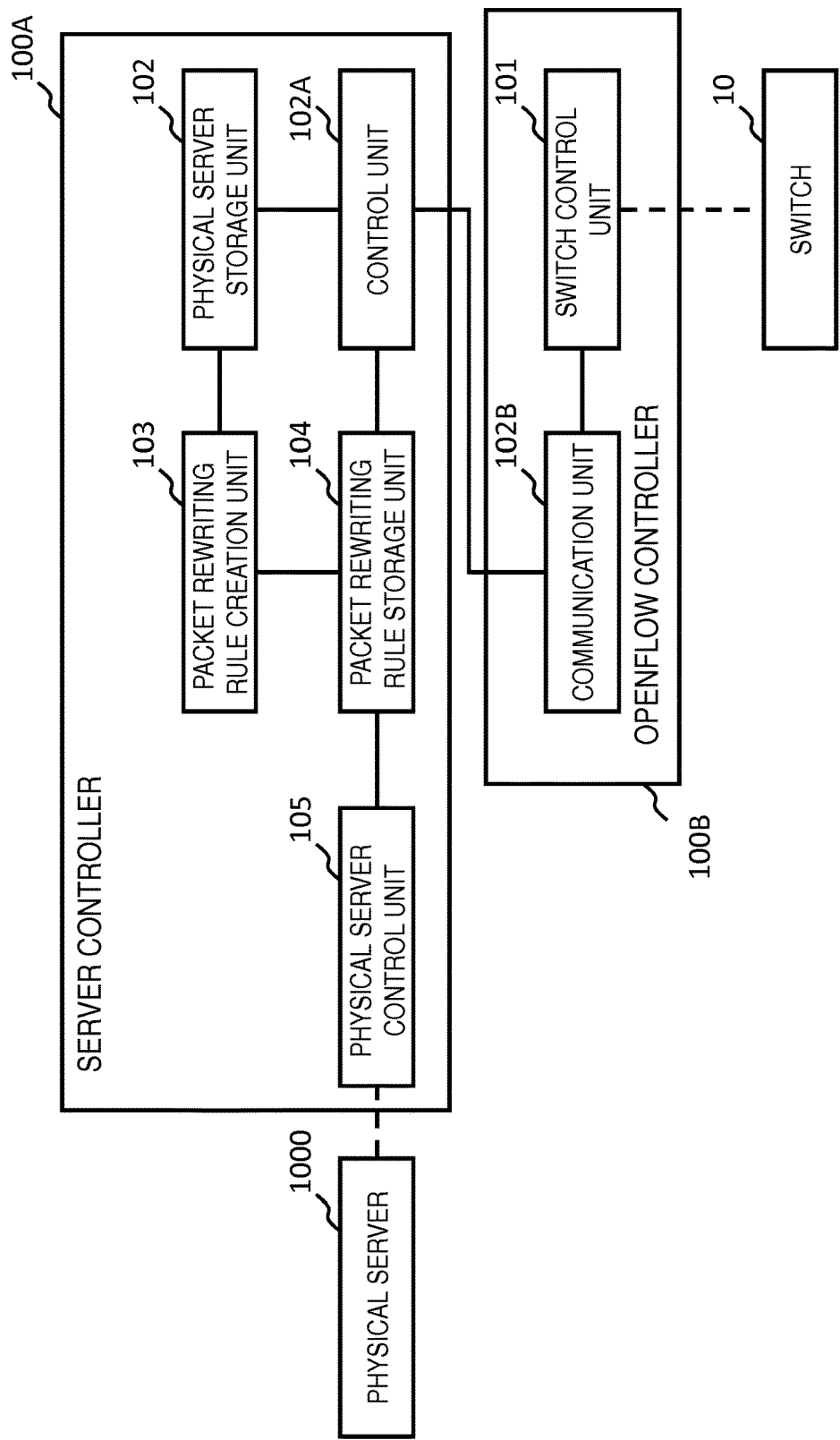
FIG. 14 is a table for describing a modified exemplary embodiment.

For example, as shown in FIG. 14, it is possible to use a configuration (second exemplary embodiment) in which OpenFlow control functionality and physical server control functionality of the controller 1000 are separated, and are respectively arranged in separate apparatuses. In this case, the OpenFlow controller 100B of FIG. 14 provides an interface for controlling an OpenFlow network with respect to the server controller 100A. On the OpenFlow controller 100B side, among functions of the controller 100 of the first exemplary embodiment, a function for recording control information (flow entries) in a switch 10 and a function for obtaining topology information of the network are arranged.

In the first exemplary embodiment as described above, in the transmission source physical server 1000, since tenant IDs to which respective VMs belong are embedded in destination MAC addresses, there are plural MAC addresses to be received by destination physical servers. In order to receive plural destination MAC addresses, it is necessary for the physical server to operate the NIC in promiscuous mode. In general, in a case where an NIC is made to operate in promiscuous mode, processing to check packet destinations by software and to drop packets not destined to itself is necessary, and there is a heavy load on the CPU (Central Processing Unit). However, in an environment of the present exemplary embodiment, since only packets matching control information (flow entry) are forwarded by a switch equivalent to an OpenFlow switch, rather than a repeater hub, packets outside of those with destinations of the physical server itself are not forwarded.

In the present exemplary embodiment, a description was given where a switch equivalent to an OpenFlow switch connects between physical servers, but there is no limitation with regard to other switch application. FIG. 15 represents NIC operation modes in various environments. In a general virtual server environment, the number of MAC addresses to be processed by respective physical servers does not exceed the number of VMs operating in that physical server. At this time, the NIC needs to operate in promiscuous mode. In order that the load of packet reception processing by software in each physical server does not become large, it is necessary that the network in this environment be configured by a switching hub, and that packets with destinations outside of the respective physical servers themselves not be forwarded thereto. In a virtual server environment, when a virtual network is built using VXLAN or NVGRE, the NIC may be operated in normal mode. When several virtual servers (VM) operate on a physical server, for the MAC address of packets to be received by the physical server, there is only 1 MAC address of a tunnel end point. In this environment, a network may be built using a repeater hub.

In the abovementioned exemplary embodiment a description was given citing examples in which packets are rewritten using a destination MAC address field of an original header, but as described above, since a rewritten packet can be restored by a switch on an output side, other fields such as destination IP address may also be rewritten.

Furthermore, content to be rewritten need not be virtual network ID (tenant ID). A similar effect can be realized by assigning a flow identifier that corresponds to a virtual network ID (tenant ID) and rewriting the flow identifier to the original header, and also using control information (flow entry) as a match condition.

Finally, preferred modes of the present invention are summarized.

[First Mode]
(Refer to the packet rewriting apparatus according to the first aspect described above.)
[Second Mode]
The packet rewriting apparatus according to the first mode, wherein the packet rewriting unit refers to the packet rewriting rule to execute processing to restore a received packet on which the rewriting has been performed.
[Third Mode]
The packet rewriting apparatus according to the first or second mode, wherein a packet rewriting rule distributed by a control apparatus that controls the switch is used as the packet rewriting rule.
[Fourth Mode]
The packet rewriting apparatus according to any one of the first to third modes, wherein a packet rewriting rule that rewrites content of a prescribed region of an original header to content used in a match condition of control information set in the switch by the control apparatus, is used as the packet rewriting rule.
[Fifth Mode]
The packet rewriting apparatus according to any one of the first to fourth modes, wherein a packet rewriting rule that rewrites content of a prescribed region of an original header, with respect to an identifier that uniquely identifies the virtual network, is used as the packet rewriting rule.
[Sixth Mode]
The packet rewriting apparatus according to any one of the first to fifth modes, wherein the packet rewriting apparatus is built into a physical server in which a virtual machine, which communicates via the tunnel end point, operates.
[Seventh Mode]
(Refer to the control apparatus (controller) according to the second aspect described above.)
[Eighth Mode]
The control apparatus (controller) according to the seventh mode, wherein the control apparatus uses the packet rewriting rule to create a match condition for control information set in a subordinate switch.
[Ninth Mode]
(Refer to the communication system according to the third aspect described above.)
[Tenth Mode]
The control system according to the ninth mode, wherein the control apparatus is provided with a packet rewriting rule creation unit that creates a packet rewriting rule to be stored in the packet rewriting rule storage unit, and a control unit that distributes the created packet rewriting rule to a packet rewriting apparatus arranged between the switch and the tunnel end point.
[Eleventh Mode]
(Refer to the packet transmission method according to the fourth aspect described above.)
[Twelfth Mode]
(Refer to the program according to the fifth aspect described above.) It is to be noted that the tenth and eleventh modes described above may be expanded with regard to the second to sixth modes, similar to the first mode.

It is to be noted that the various disclosures of the abovementioned Non-Patent Literature are incorporated herein by reference thereto. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments and examples, respective elements of the respective drawings, and the like) are possible within the scope of the claims of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST 10 switch
100 controller
100A server controller
100B OpenFlow controller
101 switch control unit
102 physical server storage unit
102A control unit
102B communication unit
103 packet rewriting rule creation unit
104 packet rewriting rule storage unit
105 physical server control unit
1000 physical server
1000A packet rewriting apparatus
1001 VM (Virtual Machine)
1002 virtual switch
1003 tunnel end point
1004 packet rewriting unit
1004A packet rewriting module
1005 packet rewriting rule storage unit
1006 controller communication unit

What is claimed is:

1. A packet rewriting apparatus, comprising:
at least one processor configured to implement:
a packet rewriting rule storage unit configured to store packet rewriting rule(s) for writing information corresponding to a virtual network identifier included in an additional header of a packet outputted from a tunnel end point, to a prescribed region of an original header; and
a packet rewriting unit configured to rewrite, in accordance with said packet rewriting rule, to a packet in which information corresponding to said virtual network identifier is written to the original header of a transmitted packet;
wherein when said packet rewriting rule storage unit does not store said packet rewriting rule which corresponds to a received packet from said tunnel end point, said packet rewriting unit is further configured to make a request for a corresponding packet rewriting rule to a controller,
wherein said packet rewriting apparatus is arranged between said tunnel end point and a switch that refers to content of the original header to determine processing to be applied to a packet, and
wherein said packet rewriting apparatus communicates with said controller according to Open Flow protocol.

2. The packet rewriting apparatus according to claim 1, wherein said packet rewriting unit is further configured to refer to said packet rewriting rule to execute processing to restore a received packet on which the rewriting has been performed.

3. The packet rewriting apparatus according to claim 1, wherein a packet rewriting rule distributed by a control apparatus that controls said switch is used as said packet rewriting rule.

4. The packet rewriting apparatus according to claim 3, wherein a packet rewriting rule that rewrites content of a prescribed region of an original header to content used in a match condition of control information set in said switch by said control apparatus, is used as said packet rewriting rule.

5. The packet rewriting apparatus according to claim 1, wherein a packet rewriting rule that rewrites content of a prescribed region of an original header to an identifier that uniquely identifies said virtual network, is used as said packet rewriting rule.

6. The packet rewriting apparatus according to claim 1, wherein said packet rewriting apparatus is built into a physical server in which a virtual machine, which communicates via said tunnel end point, operates.

7. A control apparatus, comprising:
at least one processor configured to implement:
a packet rewriting rule creation unit configured to create a packet rewriting rule to write information corresponding to a virtual network identifier included in an additional header of a packet outputted from a tunnel end point, to a prescribed region of an original header; and
a control unit configured to distribute said created packet rewriting rule to a packet rewriting apparatus arranged between a switch and said tunnel end point,
wherein said control unit is further configured to respond to a request for a corresponding packet rewriting rule from said packet rewriting apparatus when a packet rewriting rule storage unit of said packet rewriting apparatus does not store said packet rewriting rule which corresponds to a received packet from said tunnel end point, and
wherein said packet rewriting apparatus communicates with said control apparatus according to Open Flow protocol.

8. The control apparatus according to claim 7, wherein said control apparatus is further configured to use said packet rewriting rule to create a match condition for control information set in a subordinate switch.

9. A communication system, comprising:
a switch configured to refer to content of an original header to determine processing to be applied to a packet;
a control apparatus configured to control said switch by setting control information that determines a match condition that matches content of the original header, and processing to be applied to a packet matching the match condition, in said switch;
a packet rewriting rule storage unit configured to store a packet rewriting rule for writing information corresponding to a virtual network identifier included in an additional header of a packet outputted from a tunnel end point, to a prescribed region of the original header; and
a packet rewriting apparatus comprising at least one processor configured to implement a packet rewriting unit configured to rewrite, in accordance with said packet rewriting rule, to a packet in which information corresponding to said virtual network identifier is written to the original header of a transmitted packet, said packet rewriting apparatus being arranged between said tunnel end point and a switch that refers to content of the original header to determinate processing to be applied to a packet, wherein when said packet rewriting rule storage unit does not store said packet rewriting rule which corresponds to a received packet from said tunnel end point, said packet rewriting unit is further configured to make a request for a corresponding packet rewriting rule to a controller, wherein path control of a packet interposed with respect to said tunnel end point is performed via said switch and said tunnel end point, and wherein said packet rewriting apparatus communicates with said controller according to Open Flow protocol.

10. The communication system according to claim 9, wherein said at least one processor in said control apparatus is further configured to implement:

a packet rewriting rule creation unit configured to create a packet rewriting rule to be stored in said packet rewriting rule storage unit; and a control unit configured to distribute said created packet rewriting rule to a packet rewriting apparatus arranged between said switch and said tunnel end point.

11. A packet transmission method, comprising:

rewriting information corresponding to a virtual network identifier included in an additional header of a packet outputted from a tunnel end point, in accordance with a packet rewriting rule for writing to a prescribed region of an original header, to a packet in which information corresponding to said virtual network identifier is written to the original header of a transmitted packet;

requesting a corresponding packet rewriting rule when said packet rewriting rule which corresponds to a received packet from said tunnel end point is not stored; and transmitting said rewritten packet to a switch via a prescribed physical port, wherein said packet computer communicates according to Open Flow protocol.

12. A non-transitory computer-readable recording medium storing a program to be executed on a computer to which a packet outputted from a tunnel end point is inputted, comprising:

a process of rewriting information corresponding to a virtual network identifier included in an additional header of a packet outputted from a tunnel end point, in accordance with a packet rewriting rule for writing to a prescribed region of an original header, to a packet in which information corresponding to said virtual network identifier is written to the original header of a transmitted packet;

a process of requesting a corresponding packet rewriting rule when said computer does not store said packet rewriting rule which corresponds to a received packet from said tunnel end point; and a process of transmitting said rewritten packet to a switch via a prescribed physical port, wherein said packet computer communicates according to Open Flow protocol.

* * * * *